United States Patent
Furukawa et al.

[11] Patent Number: 6,039,475
[45] Date of Patent: Mar. 21, 2000

[54] RETAINER FOR ROLLER BEARING AND METHOD FOR MANUFACTURING THE SAME

[75] Inventors: Taichiro Furukawa, Hamamatsu; Kohhei Kondoh, Shizuoka; Atsushi Yamashita; Seiji Kanbori, both of Fukuroi, all of Japan

[73] Assignee: NTN Corporation, Osaka, Japan

[21] Appl. No.: 08/976,005

[22] Filed: Nov. 21, 1997

Related U.S. Application Data

[63] Continuation of application No. 08/814,008, Mar. 10, 1997, abandoned, which is a continuation of application No. 08/345,761, Nov. 22, 1994, abandoned.

[30] Foreign Application Priority Data

Nov. 30, 1993 [JP] Japan .................................. 5-300117

[51] Int. Cl.$^7$ ...................................................... F16C 33/54
[52] U.S. Cl. ........................................ 384/580; 29/898.067
[58] Field of Search ........................ 29/898.067; 384/580, 384/576, 572

[56] References Cited

U.S. PATENT DOCUMENTS

| | | | |
|---|---|---|---|
| 3,802,754 | 4/1974 | Pitner | 384/580 |
| 3,878,705 | 4/1975 | Iffland | 29/898.067 |
| 4,952,079 | 8/1990 | Lingner | 384/580 |
| 5,328,277 | 7/1994 | Moulton | 384/580 |

Primary Examiner—Lenard A. Footland
Attorney, Agent, or Firm—Nikaido Marmelstein Murray & Oram

[57] ABSTRACT

A retainer and method of manufacturing the same which makes it possible to form roller stopper lugs reliably on broken surfaces on the side faces of the crossbars formed by punching and also guide surfaces which can guide rollers with high accuracy. A plurality of protrusions are formed on both sides of the crossbars. The surfaces of the protrusions are ironed in both thickness directions to form roller stopper lugs at both ends of the protrusions. The flat surfaces formed on the protrusions by ironing serve as the roller guide surfaces. Thus, the rising and sinking amount of the rollers can be controlled with high accuracy.

2 Claims, 6 Drawing Sheets

RETAINER FOR ROLLER BEARING AND METHOD FOR MANUFACTURING THE SAME

This application is a continuation of application Ser. No. 08/814,008 filed Mar. 10, 1997, abandoned, which is a continuation of Ser. No. 08/345,761, filed Nov. 22, 1994, abandoned.

BACKGROUND OF THE INVENTION

This invention relates to a retainer for a roller bearing used in automotive transmissions and other ordinary machinery, and more specifically relates to a structure for retaining rollers in the pockets formed in the retainer.

A retainer for a roller bearing is required to positively prevent dropouts of needle rollers, to be easy to handle and easy to assemble rollers.

There are two known methods for retaining rollers in such a retainer. One method, shown in FIGS. 11 and 12, comprises the steps of punching a steel strip 21 using a punch and a die to form pockets 22 for retaining rollers, and forming upper and lower stopper lugs 23 and 24 by caulking both sides of the pockets 22 with jigs 26 and 27 to prevent rollers 25 from dropping out of the pockets. After forming the stopper lugs, the steel strip 21 is rolled into an annular retainer.

In the second method, shown in FIGS. 13 and 14, crossbars 32 defining roller pockets 31 are bent so that they are partially located below the central axis of each roller and partially above it. As shown in FIG. 14, the upper and lower portions of the crossbars 32 serve as upper and lower stopper lugs for preventing the rollers 33 from dropping out of the pockets.

In the first method, side surfaces of the pockets 22 formed by punching comprise a flat shear surface a formed on the punching starting side and an outwardly deflected broken surface b formed on the side remote from the punching starting side. If the side surfaces are caulked by lug-forming jigs 26, 27 from the shear surface a toward the broken surface b, dimensional variations of the lugs tend to increase. Such lugs may be too small in the amount of projection or in an extreme case, lugs may not be formed at all.

In the second method, since the rollers 33 are held in position making use of the thickness of the crossbar portions 32, their thickness has to be less than ½ of the roller diameter. But if the roller diameter is small and the inner diameter of the retainer is relatively large, the thickness-to-diameter ratio of the retainer may decrease to such an extent that its rigidity is insufficient.

U.S. Pat. No. 3,494,684 discloses a retainer for a roller bearing in which the side faces of the pockets are partially ironed to form roller stopper lugs at the diametrically outer and inner ends of each pocket. In this case, the entire side faces of the crossbars not subjected to ironing are used as guide surfaces for the rollers.

One problem of this arrangement is that it is difficult to form guide surfaces uniformly and with high accuracy because large part of the side faces of crossbars is used as roller guide surfaces.

Moreover, burrs will be inevitably formed by ironing. If such burrs are left unremoved, they will interfere with rollers, making it difficult to smoothly guide the rollers.

An object of this invention is to provide a retainer for roller bearing which has a high strength and is high in mass-productivity, and a method of manufacturing the same which makes it possible to form roller stopper lugs and roller guide surfaces reliably without being influenced by broken surfaces formed by punching or by burrs formed by ironing.

SUMMARY OF THE INVENTION

The retainer for a roller bearing according to this invention has a plurality of pockets formed in peripheral surface thereof to accommodate rollers, a plurality of protrusions formed on both side faces of crossbars between the pockets, and a plurality of roller stopper lugs formed by ironing on the protrusions only or on the protrusions and the side faces of the crossbars at inner and outer edges thereof, whereby guiding the rollers on the surfaces of the protrusions.

The method for manufacturing a retainer for a roller bearing according to this invention comprises the steps of forming in a strip a plurality of roller accommodating pockets arranged at intervals with protrusions projecting from both sides of crossbars between the pockets, ironing the protrusions only or the protrusions and the side faces of the crossbars from both directions of thickness of the retainer, thereby forming roller stopper lugs on both edges of the retainer, and forming the strip into an annular shape.

In this method, the crossbars formed between the pockets may be bent in the direction of thickness between their central portion and both ends thereof and wherein the side faces of the crossbars are ironed at the central portions and at both ends thereof.

To form roller stopper lugs on the side faces of crossbars of the retainer, the surfaces of the retainer are ironed or scarfed from their shear surfaces toward broken surfaces or vice versa. Since the lugs are formed by ironing the material so as to fill the broken surfaces with the displaced material, roller stopper lugs can be formed reliably even on the broken surfaces.

Since the smooth and flat surfaces formed on the protrusions by ironing are used as guide surfaces for the rollers and they are free from burrs, the rollers can be guided smoothly with high accuracy, so that the floating/sinking amount of the rollers can be controlled easily.

Moreover, since the thickness of the crossbars between pockets can be changed freely, it is possible to prevent decrease in rigidity even if the retainer has a large diameter. Also, since the lugs can be shaped to the shapes of the jigs used for ironing, high productivity is achieved.

Other features and objects of the present invention will become apparent from the following description made with reference to the accompanying drawings, in which:

DETAILED DESCRIPTION OF THE PREFERRED EMBODIMENT

FIGS. 1–6 show a method of manufacturing a retainer embodying this invention.

Figure 1:
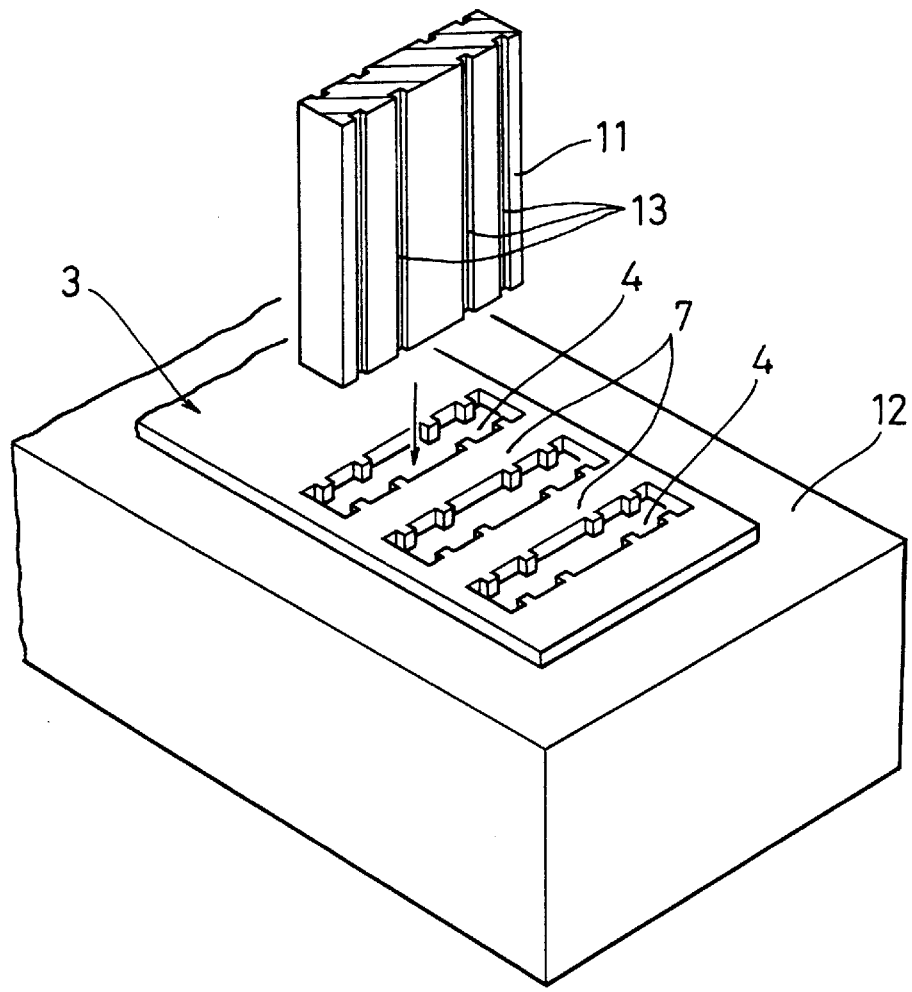
FIG. 1 is a perspective view showing the step of punching pockets in the method according to the present invention.
Figure 2:
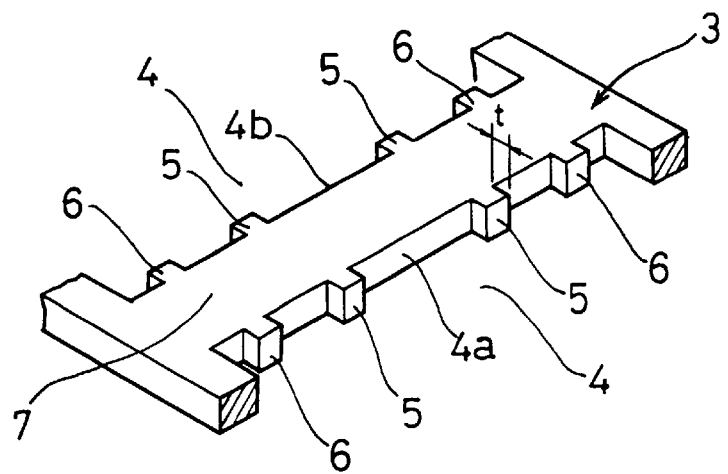
FIG. 2 is a perspective view showing the side of a pocket formed by punching.

In this method, as shown in FIGS. 1 and 2, a plurality of roller pockets 4 are punched in a steel strip 3 at predetermined angular intervals by a punch 11 and a die 12.

The punch 11 used has three to four grooves 13 in each side, so that three to four protrusions 5 and 6 will be formed on either side 4a, 4b of each pocket 4 and thus of crossbar portions 7. The protrusions 5 and 6 protrude from the side faces 4a and 4b of the crossbar portion 7 by an amount t equal to or greater than the distance by which the broken plane b of the surface of each protrusion 5, 6 retracts from the shear plane a (FIGS. 2 and 4).

Figure 3:
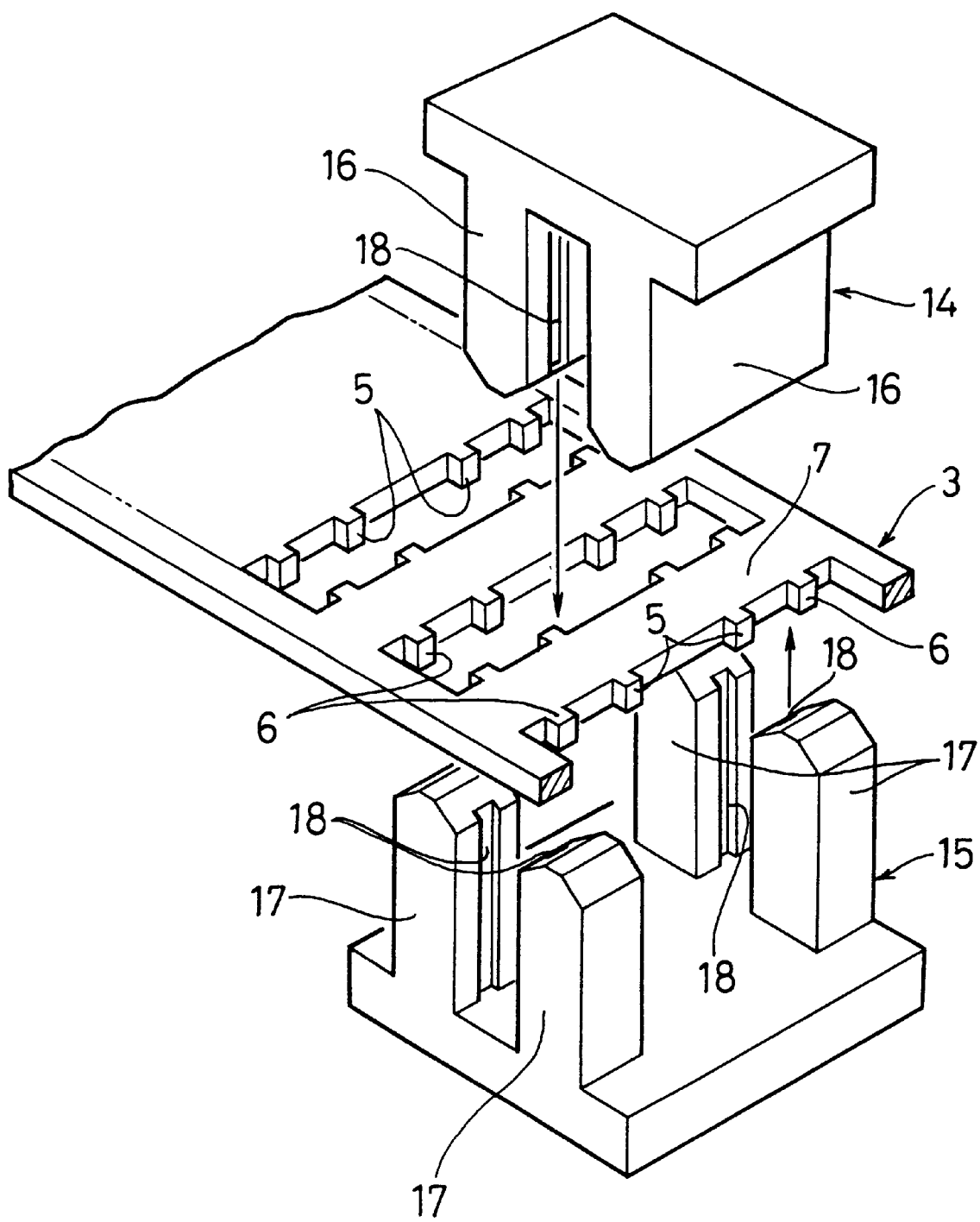
FIG. 3 is a perspective view showing the ironing step using lug-forming jigs.
Figure 4:
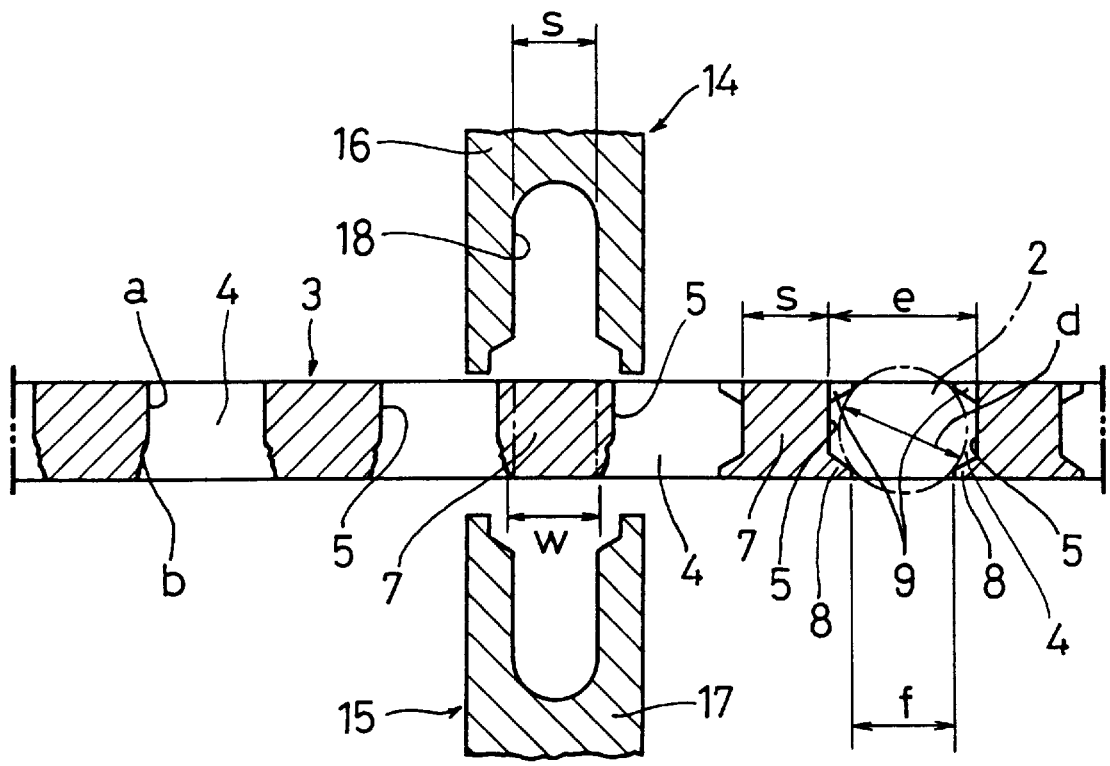
FIG. 4 is a sectional view schematically showing the ironing step.

After punching the pockets, as shown in FIGS. 3 and 4, lug-forming jigs 14 and 15 are pressed from top and bottom against the crossbar portions 7 between the roller pockets 4 to iron the surfaces of the protrusions 5 and 6.

The lug-forming jigs 14 and 15 have complementary caulking arms 16 and 17, respectively, formed with oppositely arranged ironing grooves 18 having a width substantially equal to the width of the protrusions 5 and 6. The distance S between the opposite walls of the ironing grooves 18 (ironing width for the crossbars 7) is substantially equal to or smaller than the minimum width W of the portion of the crossbars 7 where the protrusions 5 and 6 are formed (FIG. 4).

The upper lug-forming jig 14 is used to iron the central protrusions 5 downwards, while the lower lug-forming jig 15 is used to iron the protrusions 6 near both ends of the pockets upwards. The lug-forming jigs 14 and 15 are not pushed completely through the protrusions 5 and 6 but stopped short of their bottom and top ends and pulled back.

Figure 5:
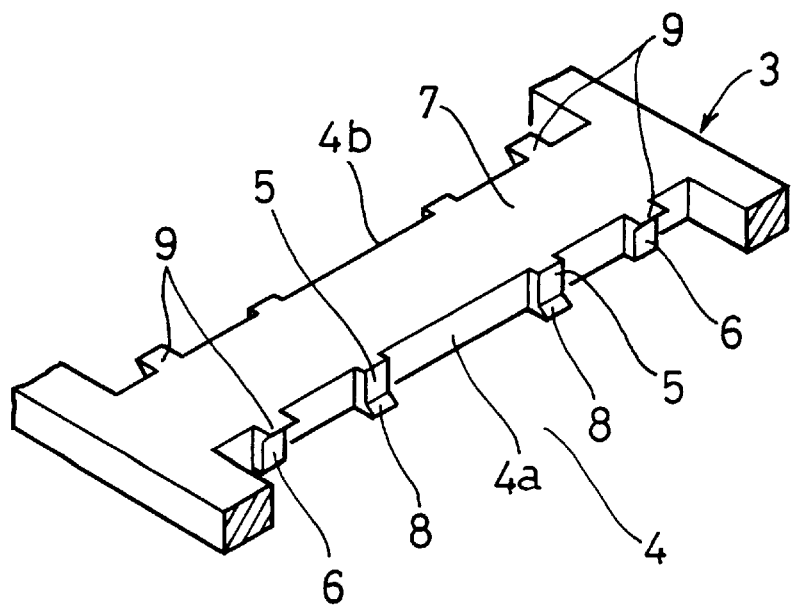
FIG. 5 is a perspective view showing the side of a pocket after ironing.

As shown in FIGS. 4 and 5, the entire shear surface and part of the broken surface forming the surface of the respective protrusions 5, 6 are ironed by the lug-forming jigs 14 and 15. Thus, flat surfaces having an accurate surface roughness and having the same width as the ironing grooves 18 formed in the jigs are formed on both sides of the crossbars 7.

Also, by ironing the protrusions 5, the material forming the protrusions is displaced downwards to their bottom ends while the material forming the protrusions 6 is displaced upwards to their upper ends, thereby filling the broken surfaces. Thus, roller stopper lugs 8 and 9 that protrude inwardly of the crossbars are formed. The distance f between the lugs 8 and 9 has to be smaller than the diameter d of the rollers 2, whereas the surface-to-surface distance e between the protrusions 5 and 6 has to be larger than the roller diameter d.

Figure 6A:
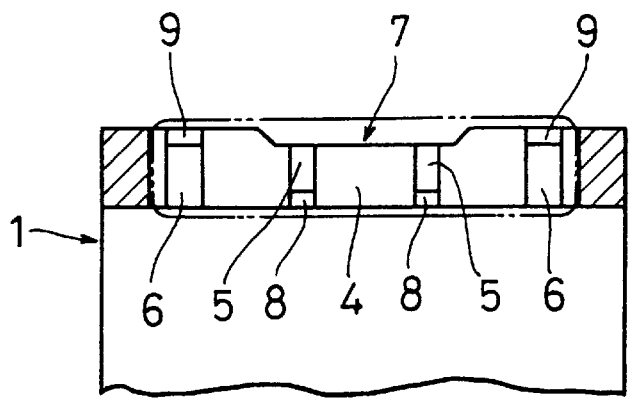
FIG. 6A is a sectional view of a retainer formed by rolling.
Figure 6B:
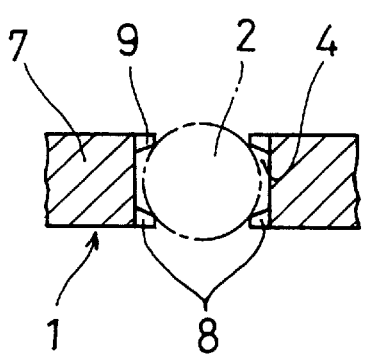
FIG. 6B is a vertical sectional view of the same.

After forming the lugs, the steel strip 3 is rolled into an annular shape with the broken surfaces 4 located radially outside as shown in FIG. 6. The ends of the annularly rolled member are welded or otherwise joined together to form a retainer 1.

Rollers 2 are then press-fitted into the retainer 1 from outside the roller stopper lugs 8 and 9. Once set in the pockets 4, the rollers 2 are positively prevented from dropping out of the pockets by the roller stopper lugs 8 and 9. Also, the rollers 2 are kept in contact with and guided by the surfaces of the protrusions 5 and 6 protruding from both sides 4a, 4b of the crossbars 7.

Since the surfaces of the protrusions 5 and 6 are formed by ironing using the lug-forming jigs 14 and 15, they have an accurate width and are sufficiently flat. Thus, the rollers 2 can be guided with higher accuracy than with the conventional arrangement in which the rollers are guided along the entire side faces of the crossbars including the broken surfaces.

Also, it is possible to change the width and surface configuration of the protrusion 5 and 6 by changing the dimensions and shape of the ironing grooves 18 formed in the lug-forming jigs 14 and 15. Thus, by controlling the shapes of the lug-forming jigs 14 and 15, it is possible to adjust the floating or sinking amount of the rollers 2 with respect to the retainer 1 with high accuracy.

Figure 7A:
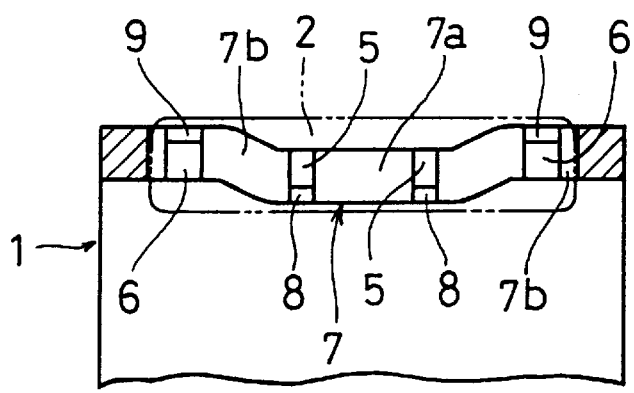
FIG. 7A is a sectional view of another embodiment of the retainer.
Figure 7B:
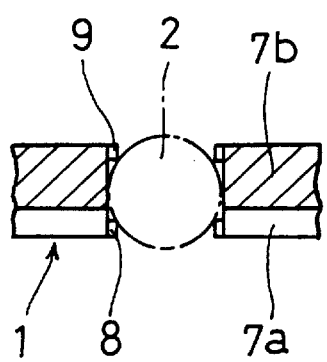
FIG. 7B is a vertical sectional view of the same.

FIG. 7 shows another embodiment of the retainer.

In this embodiment, the crossbars 7 between the pockets 4 are bent at portions between its central portion 7a and both ends 7b in the direction of thickness. Protrusions 5 and 6 for guiding the rollers 2 are formed on the central bent portion 7a and at both ends 7b, respectively.

Roller stopper lugs 8 and 9 are formed at the radially inner and outer ends of the protrusions 5 and 6, respectively, by ironing them.

Since the crossbars 7 are bent in such a manner, the guide distance for the rollers 2 can be increased in the direction of thickness of the pockets. Thus, even if the crossbars 7 of this embodiment are thinner than those shown in FIG. 6, it is possible to guide the rollers with sufficient rigidity.

By reducing the thickness of the crossbars 7, it is possible to reduce the amount of ironing of the protrusions 5 and 6 and thus to reduce the area of the broken surfaces formed by punching.

Figure 8:
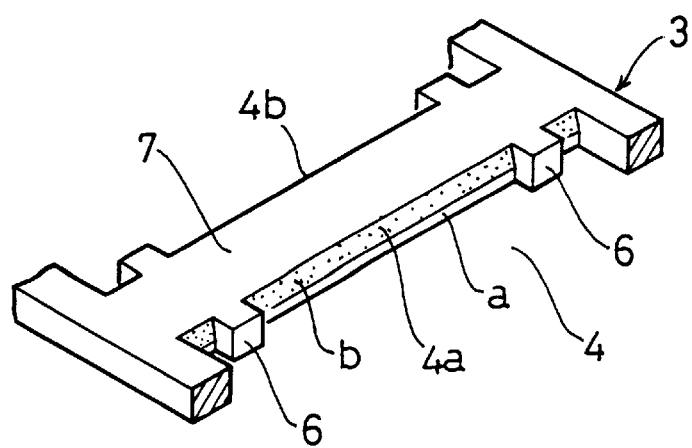
FIG. 8 is a perspective view showing the side of a pocket after punching in a second embodiment of the manufacturing method.
Figure 9:
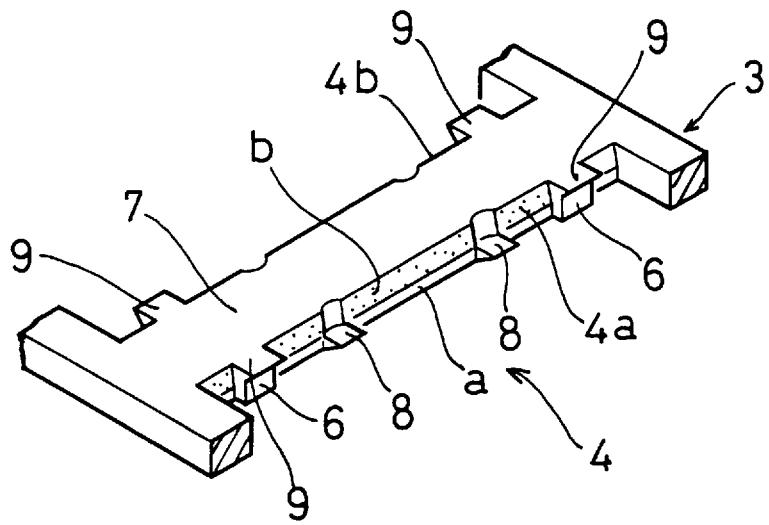
FIG. 9 is a perspective view showing the side of a pocket after the ironing step of the same.
Figure 10:
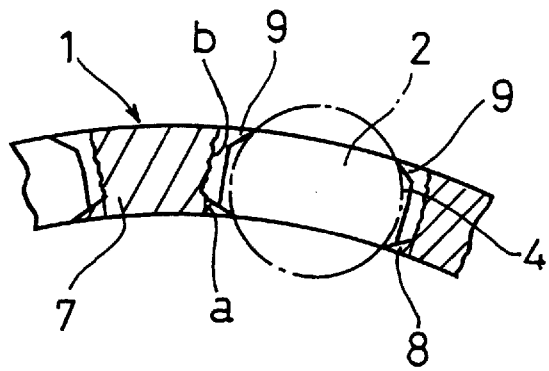
FIG. 10 is a sectional view showing a retainer after rolled of the same.
Figure 11:
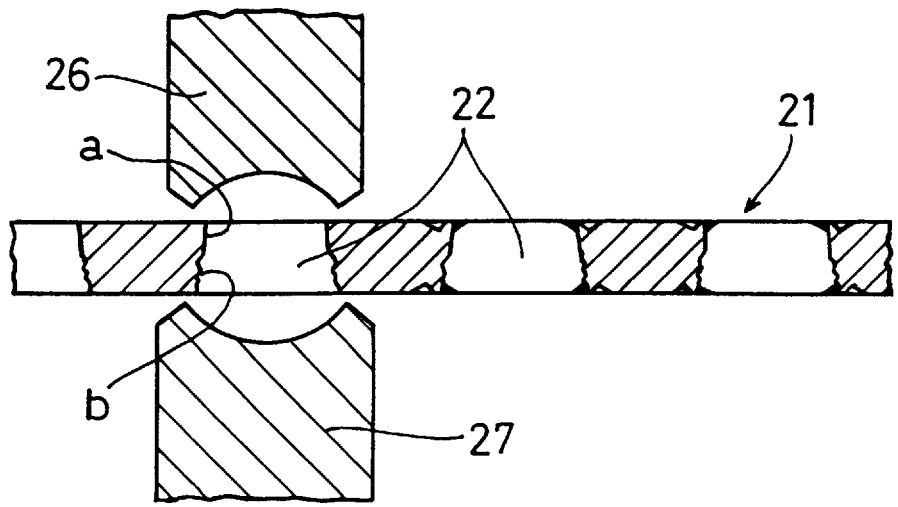
FIG. 11 is a sectional view showing how pockets are formed in a prior art method.
Figure 12:
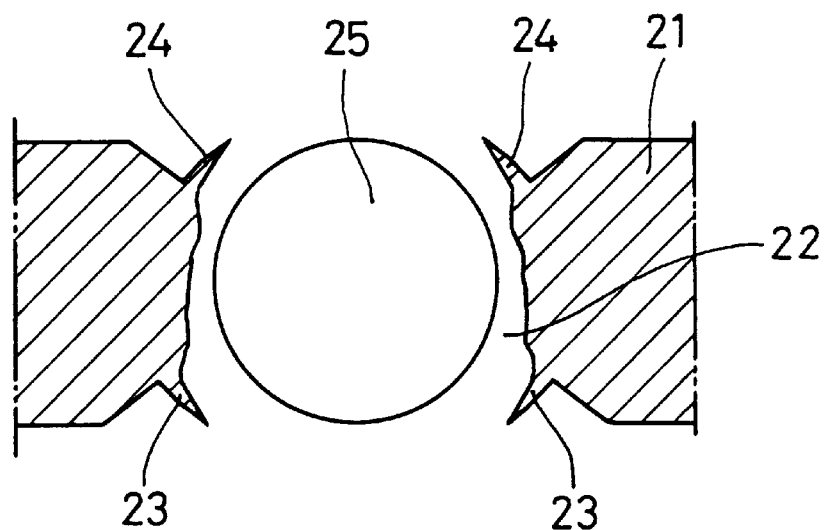
FIG. 12 is an enlarged sectional view showing how lugs are formed in the prior art method.
Figure 13:
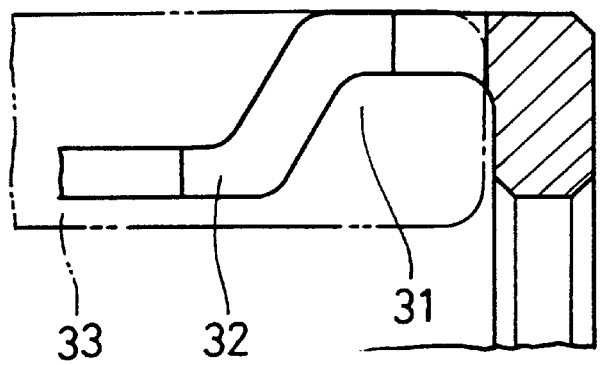
FIG. 13 is a partial enlarged sectional view of a conventional retainer of a different type.
Figure 14:
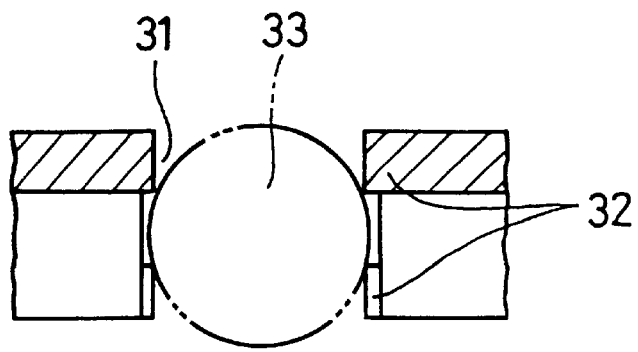
FIG. 14 is a vertical sectional view of a retainer shown in FIG. 13.

FIGS. 8 to 10 show the second embodiment of the method of manufacturing a retainer.

In this embodiment, only protrusions 6 are formed at both ends of each side of the crossbars 7 by punching. Each protrusion 6 is ironed from the shear surface a toward the broken surface b to form a roller stopper lug 9 on the broken surface.

Also, the side faces 4a and 4b between the protrusions 6 are directly ironed from the broken surface b toward the shear surface a to form roller stopper lugs 8 on the shear surface. In this case, since the shear surface a has been formed with a relatively high accuracy, it is possible to caulk the material on the shear surface to form roller stopper lugs 8, 9 of a predetermined size without forming protrusions.

After forming lugs, the steel strip is rolled with the broken surfaces b located radially outside to form an annular retainer. By rolling the steel strip in this way, the broken surfaces b are deformed so as to spread outwards, so that they will never come into contact with the rollers 2. In other words, the rollers are brought into contact with and guided by the surfaces of the protrusions 6 only.

What is claimed is:

1. A method of manufacturing a retainer for a roller bearing, comprising the steps of forming in a strip a plurality of roller accommodating pockets arranged at intervals with protrusions projecting from both sides of crossbars between said pockets, ironing said protrusions only or said protrusions and the side faces of said crossbars from both directions of thickness of the retainer along the entire thickness of said crossbars, thereby forming roller stopper lugs on both edges of the retainer, and forming said strip into an annular shape.

2. A method of manufacturing a retainer for a roller bearing as claimed in claim 1 wherein said crossbars formed between said pockets are bent in the direction of thickness between their central portion and both ends thereof and wherein the side faces of said crossbars are ironed at said central portions and at said both ends thereof along the entire thickness of said crossbars.

* * * * *